(12) United States Patent
You et al.

(10) Patent No.: US 9,552,523 B2
(45) Date of Patent: Jan. 24, 2017

(54) APPARATUS AND METHOD FOR GENERATING VIRTUAL LANE, AND SYSTEM FOR CONTROLLING LANE KEEPING OF VEHICLE WITH THE APPARATUS

(71) Applicant: HYUNDAI MOBIS CO., LTD., Seoul (KR)

(72) Inventors: Eun Young You, Yongin-si (KR); Kyung Jin Ryu, Yongin-si (KR); Tae Hun Hwang, Yongin-si (KR); Kyu Hoon Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 60 days.

(21) Appl. No.: 14/140,767

(22) Filed: Dec. 26, 2013

(65) Prior Publication Data

US 2015/0145664 A1 May 28, 2015

(30) Foreign Application Priority Data

Nov. 28, 2013 (KR) .................. 10-2013-0146212

(51) Int. Cl.
*G06K 9/00* (2006.01)
*B60W 30/12* (2006.01)

(52) U.S. Cl.
CPC .......... *G06K 9/00798* (2013.01); *B60W 30/12* (2013.01)

(58) Field of Classification Search
USPC ............... 340/435, 439, 438, 431, 436, 471, 576, 340/905, 935, 988; 701/301, 1, 532, 533, 70, 93
See application file for complete search history.

(56) References Cited

U.S. PATENT DOCUMENTS 7,019,669 B1* 3/2006 Carr .................. G08G 1/164
340/906
7,542,840 B2* 6/2009 Kawakami et al. ............ 701/93
7,697,698 B2* 4/2010 Brown ................... B60Q 9/008
340/435

(Continued)

FOREIGN PATENT DOCUMENTS

JP 2013-025535 A 2/2013
KR 10-2011-0054144 A 5/2010

(Continued)

OTHER PUBLICATIONS

Korean Office Action issued on Nov. 22, 2014 in counterpart Korean application No. 10-2013-0146212 (5 pages, in Korean).

*Primary Examiner* — Fekadeselassie Girma
(74) *Attorney, Agent, or Firm* — NSIP Law

(57) ABSTRACT

Disclosed are an apparatus and a method for generating a virtual lane, which correct or estimate an undetected lane depending on detection of a lane at each side and a system for controlling lane keeping of a vehicle with the apparatus. The apparatus for generating a virtual lane according to the present invention includes: a lane detection judging unit configured to judge whether both lanes of a front road are normally detected based on a front image; a lane correction unit configured to generate a virtual lane by correcting one lane based on the other lane when it is judged that the one lane of both lanes is not normally detected; and a lane estimation unit configured to generate the virtual lane by estimating both lanes based on previously detected lane information when it is judged that either lane is not normally detected.

13 Claims, 9 Drawing Sheets

(56) References Cited

U.S. PATENT DOCUMENTS

| | | | | |
|---|---|---|---|---|
| 8,611,609 | B2* | 12/2013 | Oyama | G06K 9/00798 382/103 |
| 2005/0273264 | A1* | 12/2005 | Gern et al. | 701/301 |
| 2006/0132295 | A1* | 6/2006 | Gern et al. | 340/438 |
| 2007/0069874 | A1* | 3/2007 | Huang et al. | 340/435 |
| 2007/0164852 | A1* | 7/2007 | Litkouhi | 340/435 |
| 2007/0179697 | A1* | 8/2007 | Holler | 701/70 |
| 2007/0200689 | A1* | 8/2007 | Kawazoe et al. | 340/435 |
| 2008/0143509 | A1* | 6/2008 | Wang et al. | 340/471 |
| 2008/0239527 | A1* | 10/2008 | Okabe | B60Q 9/008 359/843 |
| 2009/0058622 | A1* | 3/2009 | Hsieh et al. | 340/435 |
| 2009/0067675 | A1* | 3/2009 | Tan | G06K 9/00798 382/104 |
| 2009/0284360 | A1* | 11/2009 | Litkouhi | 340/439 |
| 2010/0013929 | A1* | 1/2010 | Lo et al. | 348/148 |
| 2010/0148948 | A1* | 6/2010 | Murphy et al. | 340/435 |
| 2010/0158518 | A1* | 6/2010 | Shin | H04J 3/0605 398/45 |
| 2010/0182139 | A1* | 7/2010 | Chen et al. | 340/435 |
| 2010/0238283 | A1* | 9/2010 | Kim | G06T 7/0042 348/135 |
| 2010/0265325 | A1* | 10/2010 | Lo et al. | 348/119 |
| 2010/0295668 | A1* | 11/2010 | Kataoka | B62D 15/025 340/435 |
| 2010/0295707 | A1* | 11/2010 | Bennie et al. | 340/988 |
| 2011/0140872 | A1* | 6/2011 | McClure | 340/431 |
| 2011/0301813 | A1* | 12/2011 | Sun | B62D 15/029 701/41 |
| 2012/0057757 | A1* | 3/2012 | Oyama | G06K 9/00798 382/104 |
| 2012/0081234 | A1* | 4/2012 | Shaffer et al. | 340/905 |
| 2012/0154588 | A1* | 6/2012 | Kim et al. | 348/148 |
| 2012/0206252 | A1* | 8/2012 | Sherony et al. | 340/438 |
| 2012/0212612 | A1* | 8/2012 | Imai et al. | 348/148 |
| 2012/0226392 | A1* | 9/2012 | Kataoka | G08G 1/167 701/1 |
| 2012/0307065 | A1* | 12/2012 | Mimeault | G08G 1/04 348/149 |
| 2012/0320210 | A1* | 12/2012 | Imai et al. | 348/148 |
| 2012/0327233 | A1* | 12/2012 | Imai et al. | 348/148 |
| 2013/0027195 | A1* | 1/2013 | Van Wiemeersch et al. | 340/431 |
| 2013/0120125 | A1* | 5/2013 | Wu | 340/439 |
| 2013/0321630 | A1* | 12/2013 | Shin | G08G 1/167 348/148 |
| 2014/0002655 | A1* | 1/2014 | Woo et al. | 348/148 |
| 2014/0002656 | A1* | 1/2014 | Woo et al. | 348/148 |
| 2014/0009618 | A1* | 1/2014 | Imai et al. | 348/148 |
| 2014/0176716 | A1* | 6/2014 | Wallat et al. | 348/148 |
| 2014/0358321 | A1* | 12/2014 | Ibrahim | G01S 19/39 701/1 |

FOREIGN PATENT DOCUMENTS

| | | |
|---|---|---|
| KR | 10-2010-0104495 A | 9/2010 |
| KR | 10-2011-0126820 A | 11/2011 |

* cited by examiner

FIG. 2

| | Case | NUMBER OF OCCURRENCES | OFFSET DIFFERENCE | LEFT AND RIGHT CURVATURES ARE DIFFERENT FROM EACH OTHER | LEFT AND RIGHT HEADING ANGLES FROM EACH OTHER | Confidence (=0) | DIFFERENCE IN LANE WIDTH |
|---|---|---|---|---|---|---|---|
| MISRECOGNITION | GUARDRAIL | 4 | 2 | 0 | 3 | 0 | 2 |
| | SHADOW | 8 | 8 | 0 | 1 | 0 | 8 |
| | BRANCH POINT | 5 | 5 | 0 | 4 | 0 | 5 |
| | LANE | 4 | 0 | 0 | 4 | 0 | 0 |
| NONRECOGNITION | ONE LANE, LANE IS NOT PRESENT | 7 | 7 | 0 | 6 | 6 | 7 |
| | ONE LANE, LANE WORN | 6 | 6 | 0 | 5 | 5 | 6 |
| | ONE LANE, LANE IS PRESENT | 3 | 3 | 0 | 3 | 3 | 3 |
| | BOTH LANES, LANE IS NOT PRESENT | 1 | 1 | 0 | 1 | 1 | 1 |
| | SUM TOTAL | 38 | 32 | 0 | 27 | 15 | 32 |

| VARIABLES | DESCRIPTION | VALUE |
|---|---|---|
| L | DIFFERENCE IN CHANGE RATE BETWEEN LEFT AND RIGHT OFFSETS | 0,1 |
| H | DIFFERENCE BETWEEN LEFT AND RIGHT HEADING ANGLES | 0,1 |
| QL | LANE ACCURACY IS ERRONEOUS AND LOW | 0,1,2 |
| QH | LANE ACCURACY IS HIGH | 0,1,2 |
| QHF | LANE ACCURACY IS MAINTAINED TO BE HIGH (HIGHLY MAINTAINED?) | 0,1 |
| LD | DIFFERENCE BETWEEN INPUT OFFSET AND OUTPUT OFFSET | 0,1,2 |

FIG. 5

| Index1 | QL | L | H | LD = 2 && State~= 0 |
|---|---|---|---|---|
| 0 | 0 | 0 | 0 | 0 |
| 0 | 1 | 0 | 0 | 0 |
| 0.1 | 0 | 1 | 0 | 0 |
| 0.1 | 1 | 0 | 0 | 0 |
| 0.2 | 1 | 1 | 0 | 0 |
| 0.3 | 1 | 1 | 1 | 0 |
| 0.4 | 0 | 0 | 1 | 0 |
| 0.5 | 0 | 1 | 1 | 0 |
| 0.5 | 2 | 0 | 0 | 0 |
| 0.5 | 0 | 0 | 0 | 1 |
| 0.5 | 1 | 0 | 0 | 1 |
| 0.5 | 0 | 1 | 0 | 1 |
| 0.5 | 1 | 0 | 1 | 1 |
| 0.5 | 1 | 1 | 0 | 1 |
| 0.5 | 1 | 1 | 1 | 1 |
| 0.5 | 2 | 1 | 0 | 0 |
| 0.9 | 0 | 0 | 1 | 1 |
| 1 | 0 | 1 | 1 | 1 |
| 1 | 2 | 0 | 0 | 1 |
| 1.1 | 2 | 0 | 1 | 0 |
| 1.4 | 2 | 1 | 0 | 1 |
| 1.5 | 2 | 1 | 1 | 0 |
| 1.6 | 2 | 0 | 1 | 1 |
| 2 | 2 | 1 | 1 | 1 |

FIG. 6

| State | DESCRIPTION |
|---|---|
| State 0 | FRONT IMAGE SENSOR SIGNAL IS ERRONEOUS, LEFT AND RIGHT OFFSETS, HEADING ANGLE, AND CURVATURE '0' ARE OUTPUT |
| State 1 | FRONT IMAGE SENSOR SIGNAL IS NORMAL LEFT AND RIGHT OFFSETS, HEADING ANGLE, CURVATURE, AND FRONT IMAGE SENSOR SIGNAL ARE OUTPUT |
| State 2 | FRONT IMAGE SENSOR SIGNAL IS ABNORMAL (LEFT CORRECTION) RIGHT OFFSET, HEADING ANGLE, CURVATURE, AND CAMERA INPUT SIGNAL ARE OUTPUT LEFT OFFSET, HEADING ANGLE, CURVATURE, AND FRONT IMAGE SENSOR SIGNAL ARE OUTPUT BY USING CAMERA RIGHT INPUT SIGNAL |
| State 3 | FRONT IMAGE SENSOR SIGNAL IS ABNORMAL (RIGHT CORRECTION) LEFT AND RIGHT OFFSETS, HEADING ANGLE, CURVATURE, AND CAMERA INPUT SIGNAL ARE OUTPUT RIGHT OFFSET, HEADING ANGLE, CURVATURE, AND FRONT IMAGE SENSOR SIGNAL ARE OUTPUT BY USING CAMERA LEFT INPUT |
| State 4 | FRONT IMAGE SENSOR SIGNAL IS ABNORMAL (ESTIMATION) VALUE SIGNAL ESTIMATED BASED ON LEFT AND RIGHT OFFSETS, HEADING ANGLE, CURVATURE, AND DYNAMIC MODEL IS OUTPUT STATE 4 MOVES TO STATE 0 AFTER BEING MAINTAINED DURING A PREDETERMINED TIME |

FIG. 8

| | Case | NUMBER OF OCCURRENCES | OFFSET DIFFERENCE | LEFT AND RIGHT CURVATURES ARE DIFFERENT FROM EACH OTHER | LEFT AND RIGHT HEADING ANGLES ARE DIFFERENT FROM EACH OTHER | Confidence (=0) | DIFFERENCE IN LANE WIDTH | APPROPRIATE NUMBER OF CORRECTIONS | RATE |
|---|---|---|---|---|---|---|---|---|---|
| MISRECOGNITION | GUARDRAIL | 4 | 2 | 0 | 3 | 0 | 2 | 3 | 75% |
| | SHADOW | 8 | 8 | 0 | 1 | 0 | 8 | 8 | 100% |
| | BRANCH POINT | 5 | 5 | 0 | 4 | 0 | 5 | 5 | 100% |
| | LANE | 4 | 0 | 0 | 4 | 0 | 0 | 3 | 75% |
| NONRECOGNITION | ONE LANE, LANE IS NOT PRESENT | 7 | 7 | 0 | 6 | 6 | 7 | 7 | 100% |
| | ONE LANE, LANE WORN | 6 | 6 | 0 | 5 | 5 | 6 | 6 | 100% |
| | ONE LANE, LANE IS PRESENT | 3 | 3 | 0 | 3 | 3 | 3 | 3 | 100% |
| | BOTH LANES, LANE IS NOT PRESENT | 1 | 1 | 0 | 1 | 1 | 1 | 1 | 100% |
| | SUM TOTAL | 38 | 32 | 0 | 27 | 15 | 32 | 36 | 94.7% |

APPARATUS AND METHOD FOR GENERATING VIRTUAL LANE, AND SYSTEM FOR CONTROLLING LANE KEEPING OF VEHICLE WITH THE APPARATUS

CROSS-REFERENCE TO RELATED APPLICATIONS

This application claims priority to and the benefit of Korean Patent Application No. 10-2013-0146212 filed in the Korean Intellectual Property Office on Nov. 28, 2013, the entire contents of which are incorporated herein by reference.

TECHNICAL FIELD

The present invention relates to an apparatus and a method for virtually generating a lane which is not detected due to nonrecognition or misrecognition. The present invention relates to a system for controlling lane keeping of a vehicle by using a detected lane or a virtually generated lane.

BACKGROUND ART

A lane keeping assistance system (LKAS) is a system that detects a lane through a sensor and prevents a vehicle from deviating from the lane by changing positional information of the detected lane to a torque value.

The LKAS is significantly influenced by accuracy of a camera when assisting the vehicle not to deviate from the lane by using road information measured through the camera.

A case frequently occurs, in which the camera nonrecognizes or misrecognizes the lane due to environmental factors such as a guardrail, a brake impression, a dual lane, snow, rain, and the like while a vehicle is driven on the road, and when the LKAS control malfunctions due to nonrecognition and misrecognition of the lane, a driver may feel a sense of difference and a dangerous situation may be caused.

Korean Patent Application Laid-Open No. 2011-0126820 discloses a lane recognizing apparatus. However, since the apparatus predicts the lane by using reliability of a camera signal, the apparatus has no solution for a case in which either lane is not detected. Therefore, the apparatus cannot solve the aforementioned problem.

SUMMARY OF THE INVENTION

The present invention has been made in an effort to provide an apparatus and a method for generating a virtual lane, which correct or estimate an undetected lane depending on detection of a lane at each side and a system for controlling lane keeping of a vehicle with the apparatus.

An exemplary embodiment of the present invention provides an apparatus for generating a virtual lane, including: a lane detection judging unit configured to judge whether both lanes of a front road are normally detected based on a front image; a lane correction unit configured to generate a virtual lane by correcting one lane based on the other lane when it is judged that the one lane of both the lanes is not normally detected; and a lane estimation unit configured to generate the virtual lane by estimating both the lanes based on previously detected lane information when it is judged that both the lanes are not normally detected.

The lane detection judging unit may judge whether both the lanes are normally detected based on an offset between a vehicle and a lane at each side.

The lane detection judging unit may judge whether both the lanes are normally detected based on the offset between the vehicle and the lane at each lane, a heading angle of the vehicle, and lane accuracy.

The lane detection judging unit may judge whether both the lanes are normally detected based on a difference value between a change rate of the offset between the vehicle and a left lane and a change rate of the offset between the vehicle and a right lane.

The lane detection judging unit may judge whether both lanes are normally detected based on a first difference value between the change rate of the offset between the vehicle and the left lane and the change rate of the offset between the vehicle and the right lane, a second difference value between a left heading angle and a right heading angle of the vehicle, and a third difference value between the lane accuracy and a reference value.

The lane detection judging unit may judge that both lanes are normally detected when an index value acquired by substituting the first difference value, the second difference value, and the third difference value is equal to a first threshold value, judge that one lane is not normally detected when the index value is more than the first threshold value or less than a second threshold value, and judge that both lanes are not normally detected when the index value is more than the second threshold value.

The lane detection judging unit may judge whether both lanes are not normally detected or the one lane is not normally detected based on a result of generating a previous virtual lane when the index value is equal to the second threshold value.

The lane correction unit may correct the one lane based on the offset between the vehicle and the lane at each side, the heading angle of the vehicle, and a curvature of the front road.

The lane correction unit may correct the left lane by using a value, which is acquired by adding a lane width to the offset between the vehicle and the right lane, as the offset between the vehicle and the left lane when the one lane is the left lane and correct the right lane by using a value, which is acquired by subtracting the lane width from the offset between the vehicle and the left lane, as the offset between the vehicle and the right lane when the one lane is the right lane.

The lane correction unit may correct the one lane so that the heading angles at both sides of the vehicle are the same as each other or correct the one lane so that the curvatures of both lanes are the same as each other on the front road.

The lane estimation unit may estimate both lanes based on first driving state information of the vehicle acquired from the front image and second driving state information of the vehicle acquired from sensors mounted on the vehicle.

The lane estimation unit may use the offset between the vehicle and the lane at each side, the heading angle of the vehicle, and the curvature of the front road as the first driving state information and use velocity and a yaw rate of the vehicle as the second driving state information.

Another exemplary embodiment of the present invention provides a method for generating a virtual lane, including: judging whether both lanes of a front road are normally detected based on a front image; generating a virtual lane by correcting one lane based on the other lane when it is judged that the one lane of both lanes is not normally detected; and generating the virtual lane by estimating both lanes based on previously detected lane information when it is judged that both lanes are not normally detected.

In the judging of whether both lanes of the front road are normally detected based on the front image, it may be judged whether both lanes are normally detected based on an offset between a vehicle and a lane at each lane, a heading angle of the vehicle, and lane accuracy.

In the generating of the virtual lane by correcting one lane based on the other lane when it is judged that the one lane of both lanes is not normally detected, the one lane may be corrected based on the offset between the vehicle and the lane at each side, the heading angle of the vehicle, and a curvature of the front road.

In the generating of the virtual lane by estimating both lanes based on the previously detected lane information when it is judged that both lanes are not normally detected, both lanes may be estimated based on the offset between the vehicle and the lane at each lane, the heading angle of the vehicle, the curvature of the front road, velocity of the vehicle and a yaw rate of the vehicle.

Yet another exemplary embodiment of the present invention provides a system for controlling lane keeping of a vehicle, including: a lane detection judging unit configured to judge whether both lanes of a front road are normally detected based on a front image; a lane detection unit configured to acquire a lane normally detected from the front image; a lane correction unit configured to generate a virtual lane by correcting one lane based on the other lane when it is judged that the one lane of both lanes is not normally detected; a lane estimation unit configured to generate the virtual lane by estimating both lanes based on previously detected lane information when it is judged that both lanes are not normally detected; a steering torque calculating unit configured to calculate steering torque for controlling the vehicle based on driving state information of both lanes and the vehicle acquired by at least one method of detection, correction, and estimation; and a lane keeping control unit configured to control the lane keeping of the vehicle based on the steering torque.

According to exemplary embodiments of the present invention, the following effects can be obtained by correcting or estimating an undetected lane depending on detection of a lane at each side.

First, a nonrecognition/misrecognition case of the lane is analyzed based on measured data and a virtual lane algorithm is configured and verified based on an index generated based on the analysis, thereby improving reliability of logic.

Second, reliability of the lane is improved by judging whether lane information measured by a front image sensor is misrecognized and nonrecognized and correcting the lane information, thereby improving performance of a system.

Third, control performance of a vehicle mounted with a lane keeping assistance system can be improved.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 2 is a table diagram illustrating a misrecognition/nonrecognition occurrence pattern and an analysis case.

FIG. 5 is a table diagram defining a relationship between a variable and an index.

FIG. 6 is a table diagram defining each state of a virtual lane algorithm.

FIG. 8 is a table diagram illustrating a result of applying the virtual lane algorithm.

Figure 1:
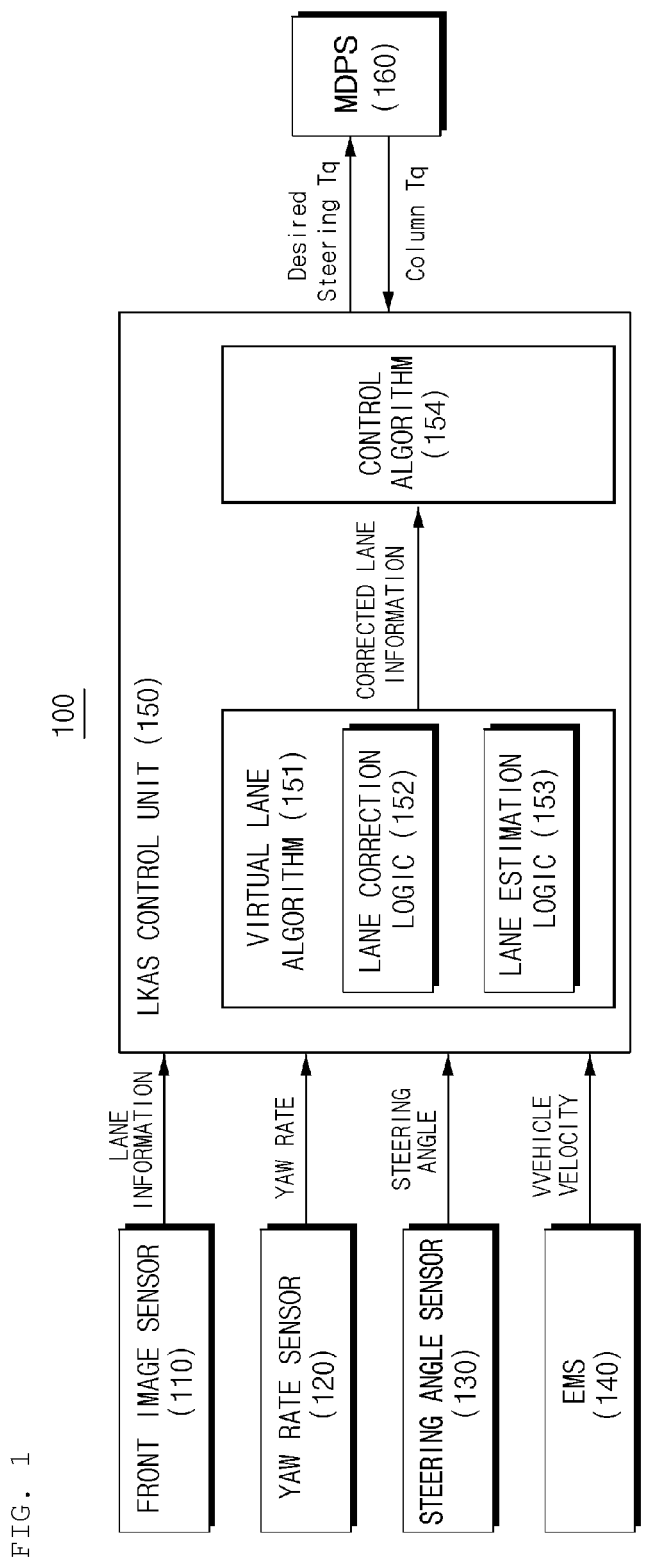
FIG. 1 is a conceptual diagram of a lane keeping assistance system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention according to the present invention will be described in detail with reference to the accompanying drawings. In the figures, even though the parts are illustrated in different drawings, it should be understood that like reference numbers refer to the same or equivalent parts of the present invention throughout the several figures of the drawing. When it is judged that specific description on known configurations or functions related in the description of the present disclosure may unnecessarily obscure the essentials of the present disclosure, the detailed description will be omitted. Hereinafter, exemplary embodiment of the present disclosure will be described. However, it should be understood that a technical spirit of the invention is not limited to the specific embodiments, but may be changed or modified by those skilled in the art.

An object of the present invention is to improve reliability and recognizability of a lane by judging nonrecognition/misrecognition of the lane measured by a front image sensor and correcting the nonrecognition/misrecognition through a virtual lane algorithm in order to improve performance and operating rate of a lane keeping assisting system.

FIG. 1 is a conceptual diagram of a lane keeping assistance system according to an exemplary embodiment of the present invention. A lane keeping assistance system 100 is a system for preventing a vehicle from deviating from a present driving lane due to a driver's carelessness.

A front image sensor 110 calculates lane information including an offset, a lane curvature, a heading angle, and the like by using a lane sensing algorithm.

Vehicle sensors include a yaw rate sensor 120, a steering angle sensor 130, an engine management system (EMS) 140, and the like. The yaw rate sensor 120 calculates yaw rate information, the steering angle sensor 130 calculates steering angle information, and the EMS 140 calculates a vehicle velocity. The vehicle sensors calculate the yaw rate information, the steering angle information, the vehicle velocity, and the like as vehicle state information.

A lane keeping assistance system (LKAS) control unit 150 calculates steering torque based on the lane information and the vehicle state information and controls motor driven power steering (MDPS) 160 by using a control algorithm 154. The LKAS control unit 150 serves to prevent a vehicle from deviating from the lane through an MDPS control.

Accordingly, performance and an operating rate of the system 100 are directly influenced depending on whether a lane signal is normally output from the front image sensor 110.

In the present invention, a misrecognition/nonrecognition case which may generally occur in the front image sensor 110 is analyzed and a virtual lane algorithm 151 is implemented based on a result of the analysis, thereby improving the performance and the operating rate of the lane keeping assistance system 100.

A lane recognition rate of the front image sensor 110 may be misrecognized or nonrecognized according to an environmental factor or an ageing road environment. For example, the lane may be misrecognized or nonrecognized according to snow, rain, counterlight, a guardrail shadow, tunnel entry/exit, a road joint point, and the like. Reliability of a lane deviation preventing control by the steering torque calculated by using nonrecognized or misrecognized lane information is not guaranteed and a driver's anxiety may be caused.

An object of the present invention is to improve reliability and recognizability of the lane by judging nonrecognition/misrecognition of the lane measured by the front image sensor 110, correcting the lane by lane correction logic 152 according to the virtual lane algorithm 151, or estimating the lane by lane estimation logic 153, in order to improve the performance and the operating rate of the lane keeping assistance system 100.

A front image camera for the lane keeping assistance system 100 generally outputs information including the offset, the lane curvature, the heading angle, lane accuracy, and the like on a present driving lane. A lane recognition case was analyzed under a domestic highway environment in order to implement the virtual lane algorithm 151 and data were measured based on the offset, the lane curvature, the heading angle, the lane accuracy, and the like. The measured road is a road including a tunnel, a branch road, the guardrail, and the like where a misrecognition/nonrecognition phenomenon may primarily occur and a total measurement section is an approximately 43 km section.

FIG. 2 illustrates a result analyzed according to misrecognition/nonrecognition occurrence patterns and cases in the measured data.

Most misrecognition and nonrecognition cases may be distinguished from normal recognition by using the offset and a case which is not distinguished by using the offset may be distinguished by using the heading angle and the lane accuracy.

The virtual lane algorithm 151 is constituted by the lane correction logic 152 and the lane estimation logic 153 as illustrated in FIG. 1.

The lane correction logic 152 calculates an opposite lane by using a normally recognized lane as a case in which it is judged that one lane of both left and right lanes is misrecognized/nonrecognized and the other lane is normally recognized.

Figures 3, 4:
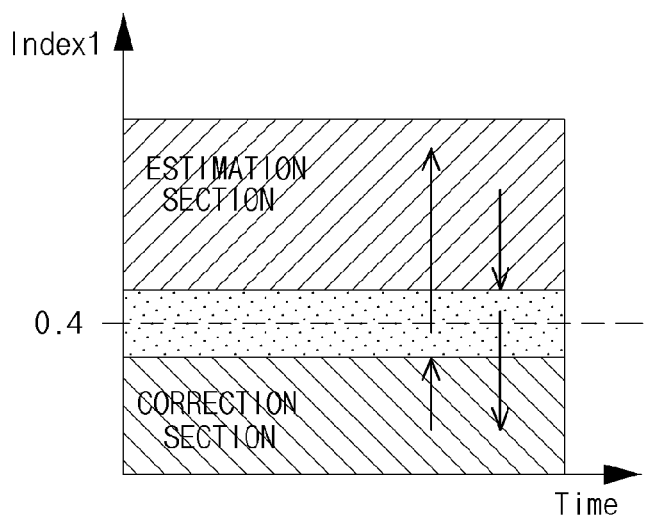
FIG. 3 is a table diagram defining a variable for an index.
FIG. 4 is a graph illustrating a reference for dividing a lane estimation section and a lane correction section according to one example.

The lane estimation logic 153 calculates a present lane by using previous lane information during a predetermined time as a case in which it is judged that both left and right lanes are misrecognized/nonrecognized. Index 1 and index 2 are generated in order to start and cancel the virtual lane algorithm 151 and a variable for the index is calculated by using the offset, the heading angle, the lane accuracy, and the like. FIG. 3 illustrates the variable for the index.

L outputs 1 when a difference in change rate between left and right offsets is equal to or more than a limit value L_th and 0 when the difference is less than the limit value L_th.

H outputs 1 when left and right heading angles are different from each other and 0 when the left and right heading angles are the same as each other.

QL outputs 2 when it is judged that both accuracies of the left and right lanes are low, 1 when only one accuracy is low, and 0 when both accuracies are not low. QH outputs 2 when it is judged that both accuracies of the left and right lanes are high, 1 when only one accuracy is high, and 0 when both accuracies are not high.

QHL outputs 1 when QH is maintained to 2 during a predetermined time and 0 if not.

LD outputs 1 when a difference in offset between the lane of the front image sensor 110 and the lane offset calculated by the virtual lane algorithm 151 is equal to or more than a limit value LD_th and 0 when the difference is less than the limit value LD_th.

Index 1 judges whether the lane is normally recognized and misrecognized/nonrecognized and determines operations of the lane correction logic 152 and the lane estimation logic 153 in the virtual lane algorithm 151, and may be expressed by the following equation.

$$\text{Index } 1 = aL \times 2^{QL} + bH|QL-1| + cHQL(QL-1) + dLD(LD-1)$$

In the above equation, a, b, c, and d represent predetermined constants.

FIG. 4 is a graph illustrating a reference of dividing a lane estimation section and a lane correction section according to one example. FIG. 5 is a table diagram defining a relationship between a variable and an index.

FIGS. 4 and 5 illustrate a value of index 1 depending on a magnitude of each variable and distinguishment of the lane correction sections 152 and the lane estimation section 153 depending on index 1.

When index 1 is 0, both left and right lanes are normally recognized, and as a result, the lane correction logic 152 or the lane estimation logic 153 does not operate. When index 1 is more than 0, one or both of the left and right lanes are misrecognized/nonrecognized, and as a result, the lane correction logic 152 or the lane estimation logic 153 operates. The lane correction logic 152 and the lane estimation logic 153 are distinguished based on 0.4 and when index 1 is less than 0.4, the lane correction logic 152 operates and when index 1 is more than 0.4, the lane estimation logic 153 operates. When index 1 is 0.4, correction or estimation is determined according to a previous step. When only one-side lane is not normally recognized in the previous step, the lane correction logic 152 operates and in the other cases, the lane estimation logic 153 operates. The reason is that it is difficult to judge which lane information is normally recognized by using only a heading value, for example, when only left and right heading angles are different from each other.

Index 2 determines cancellation of the lane correction logic 152 and the lane estimation logic 153, and may be expressed by the following equation.

$$\text{Index } 2 = QHF - 4^{QL} \times (L + LD + H)$$

When index 2 is equal to or more than 1, the operation of the lane correction logic 152 or the lane estimation logic 153 is cancelled in a state in which both the left and right lanes are normally recognized and a difference between the lane, that is, an input of the virtual lane algorithm 151 through the front image sensor 110 and an output of the virtual lane algorithm 151 is equal or less than the limit value LD_th.

Figure 7:
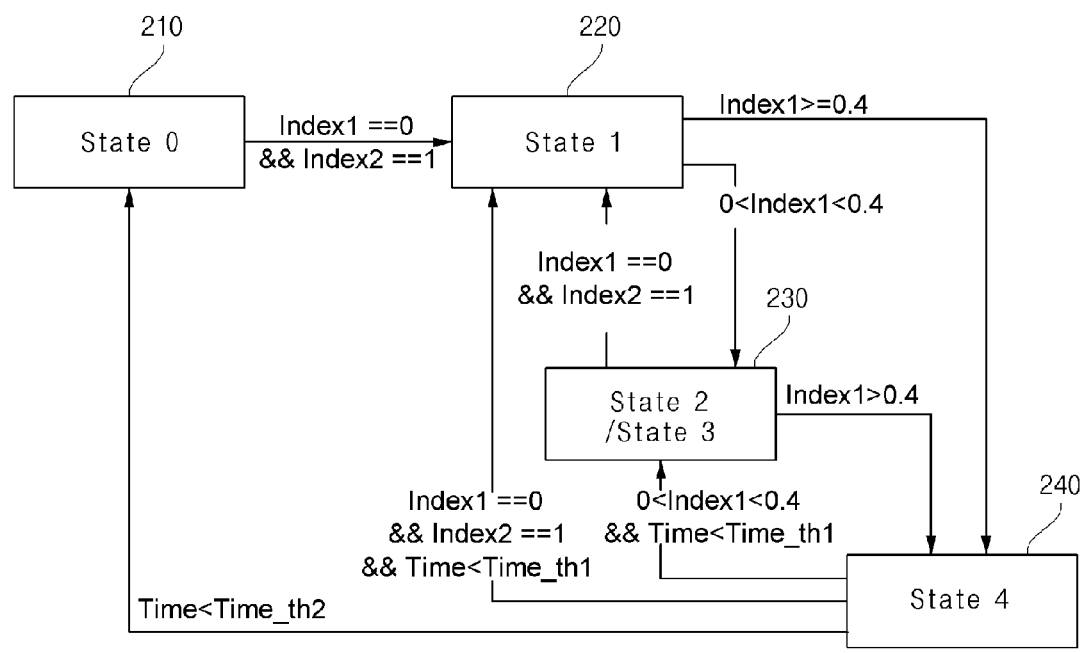
FIG. 7 is a flowchart sequentially illustrating the virtual lane algorithm.

The virtual lane algorithm 151 is divided into a total of five states. FIG. 6 illustrates a description of each state and FIG. 7 illustrates a state change depending on a condition.

The virtual lane algorithm 151 starts from state 0 210 and when index 1 is 0 and index 2 is 1, the virtual lane algorithm 151 moves to state 1 220.

State 1 220 outputs the offset, the heading angle, the lane curvature, and the like that are input from the front image sensor 110 when both the left and right lanes are normally recognized. In state 1 220, a lane width used in the lane correction logic 152 is calculated and the lane width is calculated as an average value of the lane width during a predetermined time.

When index 1 has a value in the range of 0 to 0.4, the virtual lane algorithm 151 moves to state 2/state 3 230 indicating a state in which the lane correction logic 152 operates and in this case, the opposite lane is corrected based on the lane judged to be normally recognized.

When index 1 is equal to or more than 0.4, the lane correction logic 152 moves to state 4 240 indicating the state in which the lane correction logic 152 operates and in this case, the lane is corrected by using vehicle sensor information and a front image sensor signal. In state 4 240, in the case where a time when the virtual lane algorithm 151 stays in state 4 240 is less than a limit value 1 Time_th1, when index 1 has a value less than 0.4, the virtual lane algorithm 151 moves to state 1 220 or state 2/state 3 230 and when the time is more than a limit value 2 Time_th2, the virtual lane algorithm 151 moves to state 0 210 and correction stops. When index 1 is 0 and index 2 is 1 in each state, the virtual lane algorithm 151 moves to state 1 220.

The lane correction logic 152 calculates the opposite lane based on the lane judged to be in a normal state between the left and right lanes and calculates the opposite lane as below by using the front image sensor signal.

left correction (state 2)
Left offset=right offset−lane width
Left heading angle=right heading angle
Left lane curvature=right lane curvature
right lane correction (state 3)
Right offset=left offset+lane width
Right heading angle=left heading angle
Right lane curvature=left lane curvature The lane estimation logic 153 performs calculation as represented in Equation 1 below by using a vehicle velocity, yaw rate information, and the front image sensor signal, which are input from a vehicle sensor, in the state in which both the left and right lanes are misrecognized/nonrecognized.

$$\begin{bmatrix} \varepsilon_{t+1} \\ \varphi_{t+1} \\ \rho_{t+1} \\ \rho'_{t+1} \end{bmatrix} = \begin{bmatrix} 1 & u\Delta t & -\frac{1}{2}u^2\Delta t^2 & -\frac{1}{6}u^3\Delta t^3 \\ 0 & 1 & -u\Delta t & -\frac{1}{2}u^2\Delta t^2 \\ 0 & 0 & 1 & u\Delta t \\ 0 & 0 & 0 & 1 \end{bmatrix} \begin{bmatrix} \varepsilon_t \\ \varphi_t \\ \rho_t \\ \rho'_t \end{bmatrix} + \begin{bmatrix} \frac{1}{2}u\Delta t^2 \\ \Delta t \\ 0 \\ 0 \end{bmatrix} \gamma_t \quad \text{[Equation 1]}$$

In the above equation, $\varepsilon$ represents the offset and $\phi$ represents the heading angle. $\rho$ represents the lane curvature and $\rho'$ represents a derivative of the curvature. u represents the velocity of the vehicle and $\gamma$ represents the yaw rate.

The virtual lane algorithm 151 was verified based on the data measured to analyze the case. A total of 38 misrecognition/nonrecognition cases occurred in a section of approximately 43 km and a result of correcting 36 cases (95%) through the virtual lane algorithm 151 may be checked.

FIG. 8 illustrates a result of applying the virtual lane algorithm 151.

Additionally, as result of checking a correction rate for a misrecognition/nonrecognition case in a general road and a highway of 300 km or more, it is verified that 398 cases (93%) of the total of 430 cases are appropriately corrected.

Figure 9:
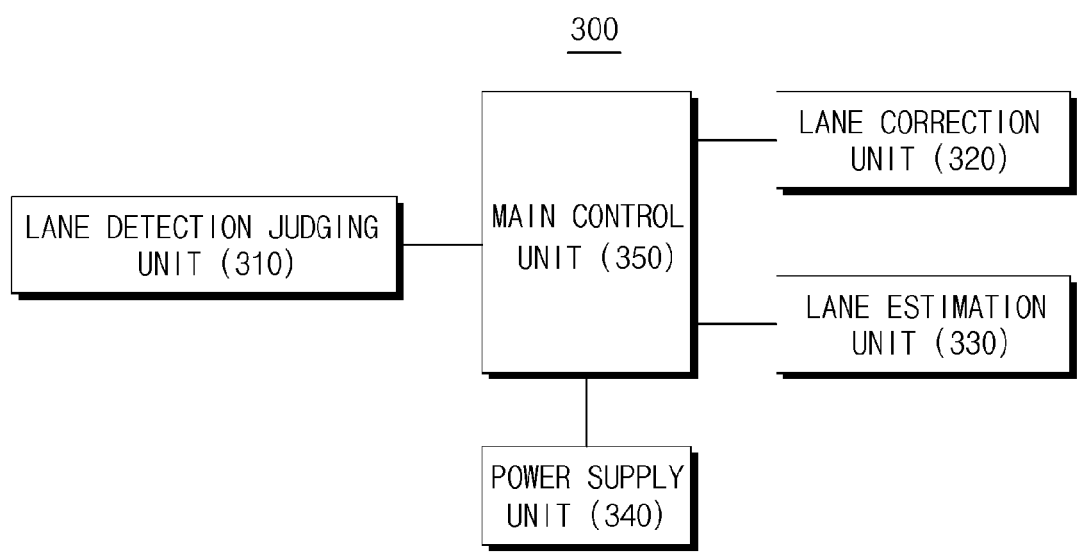
FIG. 9 is a block diagram schematically illustrating an apparatus for generating a virtual lane according to an exemplary embodiment of the present invention.

As described above, the virtual lane algorithm has been described with reference to FIGS. 1 to 8. Next, an apparatus based on the virtual lane algorithm, that is, a virtual lane generating apparatus will be described. FIG. 9 is a block diagram schematically illustrating an apparatus for generating a virtual lane according to an exemplary embodiment of the present invention.

According to FIG. 9, a virtual lane generating apparatus 300 includes a lane detection judging unit 310, a lane correction unit 320, a lane estimation unit 330, a power supply unit 340, and a main control unit 350.

The power supply unit 340 serves to supply power to respective components constituting the virtual lane generating apparatus 300. The main control unit 350 serves to control operations of all of the respective components constituting the virtual lane generating apparatus 300. When it is considered that the virtual lane generating apparatus 300 may be controlled by a main ECU in the vehicle or mounted in the ECU, the power supply unit 340 and the main control unit 350 may not be provided in the exemplary embodiment.

The lane detection judging unit 310 serves to judge whether both lanes of a front road are normally detected based on a front image.

The lane detection judging unit 310 may judge whether both lanes are normally detected based on an offset between the vehicle and the lane at each lane. In this case, the lane detection judging unit 310 may judge whether both lanes are normally detected based on a difference value between a change rate of the offset between the vehicle and the left lane and a change rate of the offset between the vehicle and the right lane.

The lane detection judging unit 310 may judge whether both lanes are normally detected based on the offset between the vehicle and the lane at each lane, the heading angle of the vehicle, and lane accuracy. In this case, the lane detection judging unit 310 may judge whether both lanes are normally detected based on a first difference value between the change rate of the offset between the vehicle and the left lane and the change rate of the offset between the vehicle and the right lane, a second difference value between a left heading angle and a right heading angle of the vehicle, and a third difference value between the lane accuracy and a reference value.

The lane detection judging unit 310 may judge that both lanes are normally detected when an index value acquired by substituting the first difference value, the second difference value, and the third difference value is equal to a first threshold value, judge that one lane is not normally detected when the index value is more than the first threshold value or less than a second threshold value, and judge that both lanes are not normally detected when the index value is more than the second threshold value.

The lane detection judging unit 310 may judge whether both lanes are not normally detected or one lane is not normally detected based on a result of generating a previous virtual lane when the index value is equal to the second threshold value. As described above, the first threshold value may be 0 and the second threshold value may be 0.4.

The lane correction unit 320 serves to generate the virtual lane by correcting one lane based on the other lane when it is judged that the one lane of both lanes is not normally detected.

The lane correction unit 320 may correct one lane based on the offset between the vehicle and the lane at each side, the heading angle of the vehicle, and a curvature of the front road.

The lane correction unit 320 may correct the left lane by using a value, which is acquired by adding the lane width to the offset between the vehicle and the right lane, as the offset between the vehicle and the left lane when one lane is the left lane and correct the right lane by using a value, which is acquired by subtracting the lane width from the offset between the vehicle and the left lane, as the offset between the vehicle and the right lane when one side is the right lane.

The lane correction unit 320 may correct one lane so that the heading angles at both sides of the vehicle are the same as each other or correct one lane so that the curvatures of both lanes are the same as each other on the front road.

The lane estimation unit 330 serves to generate the virtual lane by estimating both lanes based on previously detected lane information when it is judged that both lanes are not normally detected.

The lane estimation unit 330 may estimate both lanes based on first driving state information of the vehicle acquired from the front image and second driving state information of the vehicle acquired from sensors mounted on the vehicle. In this case, the lane estimation unit 330 may use the offset between the vehicle and the lane at each side, the heading angle of the vehicle, and the curvature of the front road as the first driving state information and use the velocity and the yaw rate of the vehicle as the second driving state information.

Next, an operating method of the virtual lane generating apparatus 300 will be described.

First, the lane detection judging unit 310 judges whether both lanes of the front road are normally detected based on the front image. The lane detection judging unit 310 judges whether both lanes are normally detected based on the offset between the vehicle and the lane at each lane, the heading angle of the vehicle, and the lane accuracy.

The lane correction unit 320 generates the virtual lane by correcting one lane based on the other lane when it is judged that the one lane of both lanes is not normally detected. The lane correction unit 320 corrects the one lane based on the offset between the vehicle and the lane at each side, the heading angle of the vehicle, and a curvature of the front road.

On the contrary, the lane estimation unit 330 generates the virtual lane by estimating both lanes based on the previously detected lane information when it is judged that both lanes are not normally detected. The lane estimation unit 330 estimates both lanes based on the offset between the vehicle and the lane at each side, the heading angle of the vehicle, the curvature of the front road, the velocity of the vehicle, and the yaw rate of the vehicle.

Figure 10:
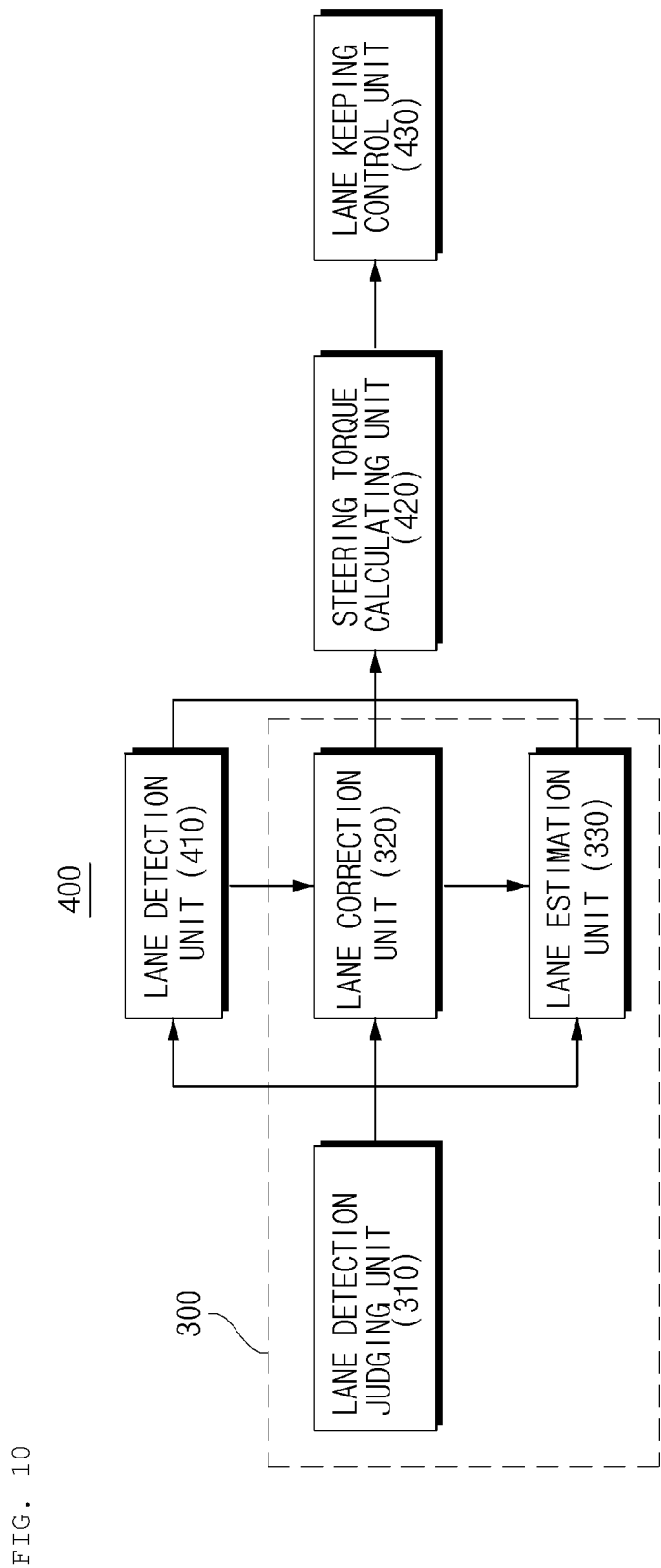
FIG. 10 is a block diagram schematically illustrating a system for controlling lane keeping of a vehicle according to an exemplary embodiment of the present invention.

Next, a system for controlling lane keeping, which includes the virtual lane generating apparatus 300 described with reference to FIG. 9, will be described. FIG. 10 is a block diagram schematically illustrating a system for controlling lane keeping of a vehicle according to an exemplary embodiment of the present invention. Referring to FIG. 10, a lane keeping control system 400 may include a virtual lane generating apparatus 300, a lane detection unit 410, a steering torque calculating unit 420, a lane keeping control unit 430, and an integrated control unit (not illustrated).

The integrated control unit controls operations of all of respective components constituting the lane keeping control system 400.

The virtual lane generating apparatus 300 has been described above with reference to FIG. 9, and as a result, a detailed description thereof will be omitted herein. The lane detection unit 410 serves to acquire the lane normally detected from the front image.

The steering torque calculating unit 420 serves to calculate steering torque for controlling the vehicle based on driving state information of both lanes and the vehicle acquired by at least one method of detection, correction, and estimation.

The lane keeping control unit 430 serves to control lane keeping of the vehicle based on the steering torque.

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and

What is claimed is:

1. An apparatus for generating a virtual lane, the apparatus comprising:
  a lane detection judging unit configured to judge whether a first lane and a second lane of a front road are normally detected based on a front image;
  a lane correction unit configured to generate, based on the judging, a virtual lane by correcting the first lane based on the second lane in response to the first lane being judged to not be normally detected; and
  a lane estimation unit configured to generate, based on the judging, the virtual lane by estimating the first lane and the second lane based on detected lane information obtained prior to generation of the virtual lane in response to the first lane and the second lane being judged to not be normally detected,
  wherein the lane estimation unit is configured to estimate the first lane and the second lane based on the detected lane information, which comprises first driving state information of a vehicle acquired from the front image and second driving state information of the vehicle acquired from sensors mounted on the vehicle,
  wherein the first driving state information comprises an offset between the vehicle and the first lane and an offset between the vehicle and the second lane, a heading angle of the vehicle, and a curvature of the front road, and the second driving state information comprises a velocity and a yaw rate of the vehicle, and
  wherein the lane detection judging unit is configured to judge whether the first lane and the second lane are normally detected based on a difference value between a change rate of the offset between the vehicle and the first lane and a change rate of the offset between the vehicle and the second lane.

2. The apparatus of claim 1, wherein the lane detection judging unit judges whether both lanes are normally detected based on the offset between the vehicle and the first lane and the offset between the vehicle and the second lane.

3. The apparatus of claim 1, wherein the lane detection judging unit is configured to judge whether the first lane and the second lane are normally detected based on the offset between the vehicle and the first lane and the offset between the vehicle and the second lane, the heading angle of the vehicle, and lane accuracy.

4. The apparatus of claim 1, wherein:
  the difference value between the change rate of the offset between the vehicle and the first lane and the change rate of the offset between the vehicle and the second lane is a first difference value; and
  the lane detection judging unit is configured to judge whether the first lane and the second lane are normally detected based on a second difference value between a left heading angle and a right heading angle of the vehicle, and a third difference value between a lane accuracy and a reference value.

5. The apparatus of claim 4, wherein the lane detection judging unit is configured to judge that the first lane and the second lane are normally detected when an index value acquired by substituting the first difference value, the second difference value, and the third difference value is equal to a first threshold value, judges that the first lane is not normally detected when the index value is more than the first threshold value or less than a second threshold value, and judges that the first lane and the second lane are not normally detected when the index value is more than the second threshold value.

6. The apparatus of claim 5, wherein the lane detection judging unit is configured to judge whether at least one of the first lane and the second lane is not normally detected based on a result of generating a previous virtual lane when the index value is equal to the second threshold value.

7. The apparatus of claim 1, wherein the lane correction unit is configured to correct the first lane based on the offset between the vehicle and the first lane and the offset between the vehicle and the second lane, the heading angle of the vehicle, and the curvature of the front road.

8. The apparatus of claim 7, wherein the lane correction unit is configured to correct the first lane by using a value, which is acquired by adding a lane width to an offset between the vehicle and the second lane, as an offset between the vehicle and the first lane when one side is the first lane and corrects the second lane by using a value, which is acquired by subtracting the lane width from the offset between the vehicle and the first lane, as an offset between the vehicle and the second lane when the one side is the second lane.

9. The apparatus of claim 7, wherein the lane correction unit is configured to correct the first lane so that the heading angles at both sides of the vehicle are the same as each other or corrects the first lane so that the curvatures of the first lane and the second lane are the same as each other on the front road.

10. A method for generating a virtual lane, the method comprising:
  judging whether a first lane and a second lane of a front road are normally detected based on a front image;
  generating, based on the judging, a virtual lane by correcting the first lane based on the second lane in response to the first lane being judged to not be normally detected; and
  generating, based on the judging, the virtual lane by estimating the first lane and the second lane based on detected lane information obtained prior to generating the virtual lane in response to the first lane and the second lane being judged to not be normally detected,
  wherein the estimating is based on the detected lane information, which comprises first driving state information of a vehicle acquired from the front image and second driving state information of the vehicle acquired from sensors mounted on the vehicle, and
  wherein the first driving state information comprises an offset between the vehicle and the first lane and an offset between the vehicle and the second lane, a heading angle of the vehicle, and a curvature of the front road, and the second driving state information comprises a velocity and a yaw rate of the vehicle, and
  wherein the lane detection judging unit is configured to judge whether the first lane and the second lane are normally detected based on a difference value between a change rate of the offset between the vehicle and the first lane and a change rate of the offset between the vehicle and the second lane.

11. The method of claim 10, wherein in the judging of whether the first lane and the second lane of the front road are normally detected based on the front image,
  it is judged whether the first lane and the second lane are normally detected based on the offset between the vehicle and the first lane and the offset between the vehicle and the second lane, the heading angle of the vehicle, and lane accuracy.

12. The method of claim 10, wherein in the generating of the virtual lane by correcting first lane based on the second lane when it is judged that the first lane is not normally detected,
the first lane is corrected based on the offset between the vehicle and the first lane and the offset between the vehicle and the second lane, the heading angle of the vehicle, and the curvature of the front road.

13. A system for controlling lane keeping of a vehicle, the system comprising:
a lane detection judging unit configured to judge whether a first lane and a second lane of a front road are normally detected based on a front image;
a lane detection unit configured to acquire a lane normally detected from the front image;
a lane correction unit configured to generate, based on the judging, a virtual lane by correcting the first lane based on the second lane in response to the first lane being judged to not be normally detected;
a lane estimation unit configured to generate, based on the judging, the virtual lane by estimating the first lane and the second lane based on detected lane information obtained prior to generation of the virtual lane in response to the first lane and the second lane being judged to not be normally detected;
a steering torque calculating unit configured to calculate steering torque for controlling the vehicle based on driving state information of the first lane and the second lane and the vehicle acquired by at least one method of detection, correction, and estimation; and
a lane keeping control unit configured to control the lane keeping of the vehicle based on the steering torque,
wherein the lane estimation unit is configured to estimate the first lane and the second lane based on the detected lane information, which comprises first driving state information of the vehicle acquired from the front image and second driving state information of the vehicle acquired from sensors mounted on the vehicle, and
wherein the first driving state information comprises an offset between the vehicle and the first lane and the offset between the vehicle and the second lane, a heading angle of the vehicle, and a curvature of the front road, and the second driving state information comprises a velocity and a yaw rate of the vehicle, and
wherein the lane detection judging unit is configured to judge whether the first lane and the second lane are normally detected based on a difference value between a change rate of the offset between the vehicle and the first lane and a change rate of the offset between the vehicle and the second lane.

* * * * *